US010996676B2

(12) United States Patent
Johnson et al.

(10) Patent No.: US 10,996,676 B2
(45) Date of Patent: May 4, 2021

(54) PROACTIVE DIRECTIONAL CONTROL SYSTEMS AND METHODS

(71) Applicant: FLIR Systems, Inc., Wilsonville, OR (US)

(72) Inventors: Mark Johnson, Vannes (FR); Ian Matt, Fareham (GB); Christopher Yeomans, Fareham (GB)

(73) Assignee: FLIR Systems, Inc., Wilsonville, OR (US)

(*) Notice: Subject to any disclaimer, the term of this patent is extended or adjusted under 35 U.S.C. 154(b) by 429 days.

(21) Appl. No.: 15/640,186

(22) Filed: Jun. 30, 2017

(65) Prior Publication Data

US 2017/0300056 A1 Oct. 19, 2017

Related U.S. Application Data

(63) Continuation-in-part of application No. 15/620,675, filed on Jun. 12, 2017, now Pat. No. 10,747,226, and
(Continued)

(51) Int. Cl.
*G05D 1/02* (2020.01)
*B63H 25/04* (2006.01)
(Continued)

(52) U.S. Cl.
CPC .......... *G05D 1/0206* (2013.01); *B63H 25/04* (2013.01); *B63H 25/06* (2013.01); *G01C 21/165* (2013.01);
(Continued)

(58) Field of Classification Search
CPC .................................................. G05D 1/0206
See application file for complete search history.

(56) References Cited

U.S. PATENT DOCUMENTS 2,968,957 A 1/1961 Condie et al.
3,301,510 A 1/1967 Cook
(Continued)

FOREIGN PATENT DOCUMENTS

CN 102692225 9/2012
CN 103149948 6/2013
(Continued)

OTHER PUBLICATIONS

Gorovyi et al., "A Novel Trajectory Restoration Algorithm for High-Resolution SAR Imaging", 2014 15th International Radar Symposium, Jun. 16, 2014, 4 pages, IEEE, Piscataway, NJ.
(Continued)

*Primary Examiner* — Raymond L Nimox
(74) *Attorney, Agent, or Firm* — Haynes and Boone, LLP

(57) ABSTRACT

Techniques are disclosed for systems and methods to provide proactive directional control for a mobile structure. A proactive directional control system may include a logic device, a memory, one or more sensors, one or more actuators/controllers, and modules to interface with users, sensors, actuators, and/or other modules of a mobile structure. The logic device is adapted to determine a steering angle disturbance estimate based on environmental conditions associated with the mobile structure, and the steering angle disturbance estimate is used to adjust a directional control signal provided to an actuator of the mobile structure. The logic device may also be adapted to receive directional data about a mobile structure and determine nominal vehicle feedback from the directional data, which may be used to adjust and/or stabilize the directional control signal provided to the actuator.

21 Claims, 8 Drawing Sheets

Related U.S. Application Data a continuation-in-part of application No. 15/239,760, filed on Aug. 17, 2016, now Pat. No. 10,337,883, which is a continuation-in-part of application No. 15/222,905, filed on Jul. 28, 2016, now Pat. No. 10,338,593, which is a continuation of application No. PCT/US2015/067959, filed on Dec. 29, 2015, which is a continuation-in-part of application No. 14/852,010, filed on Sep. 11, 2015, now Pat. No. 9,821,892, said application No. 15/239,760 is a continuation of application No. PCT/US2015/015281, filed on Feb. 10, 2015, said application No. 15/222,905 is a continuation of application No. PCT/US2015/013141, filed on Jan. 27, 2015, said application No. 15/620,675 is a continuation-in-part of application No. 14/321,646, filed on Jul. 1, 2014, now Pat. No. 9,676,464, said application No. 14/852,010 is a continuation of application No. PCT/US2014/026725, filed on Mar. 13, 2014, said application No. 14/321,646 is a continuation of application No. PCT/US2014/013441, filed on Jan. 28, 2014.

(60) Provisional application No. 62/099,016, filed on Dec. 31, 2014, provisional application No. 62/099,022, filed on Dec. 31, 2014, provisional application No. 62/099,032, filed on Dec. 31, 2014, provisional application No. 61/942,517, filed on Feb. 20, 2014, provisional application No. 61/934,678, filed on Jan. 31, 2014, provisional application No. 61/785,327, filed on Mar. 14, 2013, provisional application No. 61/759,238, filed on Jan. 31, 2013.

(51) Int. Cl.
| | | |
|---|---|---|
| *G01C 21/16* | (2006.01) | |
| *G01C 21/18* | (2006.01) | |
| *B63H 25/06* | (2006.01) | |
| *G01P 21/02* | (2006.01) | |
| *G01C 21/20* | (2006.01) | |
| *B63B 35/00* | (2020.01) | |

(52) U.S. Cl.
CPC ............ *G01C 21/18* (2013.01); *G01P 21/025* (2013.01); *B63B 2035/009* (2013.01); *B63H 2025/045* (2013.01); *G01C 21/203* (2013.01)

(56) References Cited

U.S. PATENT DOCUMENTS

| | | | |
|---|---|---|---|
| 3,436,531 A | 4/1969 | Throckmorton | |
| 3,488,954 A | 1/1970 | Thomas et al. | |
| 3,857,353 A * | 12/1974 | Mounce | G05D 1/0206 114/144 C |
| 3,942,491 A * | 3/1976 | Seite | F02P 5/15 123/406.24 |
| 5,191,341 A * | 3/1993 | Gouard | G01C 21/203 342/386 |
| 5,362,263 A | 11/1994 | Petty | |
| 5,509,369 A * | 4/1996 | Ford | B63H 21/265 114/150 |
| 5,523,951 A | 6/1996 | Kriesgman et al. | |
| 6,026,759 A * | 2/2000 | Hazelett | B63B 39/06 114/126 |
| 6,273,771 B1 * | 8/2001 | Buckley | B63H 21/213 114/144 RE |
| 6,308,649 B1 * | 10/2001 | Gedeon | B63B 49/00 114/39.11 |
| 6,450,112 B1 | 9/2002 | Deghuee | |
| 7,469,168 B1 | 12/2008 | Richey | |
| 8,068,949 B2 * | 11/2011 | Duggan | G05D 1/0061 244/75.1 |
| 8,275,544 B1 | 9/2012 | Wells et al. | |
| 8,594,879 B2 * | 11/2013 | Roberge | A01B 69/007 701/23 |
| 9,068,855 B1 * | 6/2015 | Guglielmo | G01C 21/36 |
| 9,176,924 B2 * | 11/2015 | Ricci | H04W 4/90 |
| 2003/0149528 A1 | 8/2003 | Lin | |
| 2007/0049139 A1 * | 3/2007 | Mizutani | B63H 21/213 440/59 |
| 2009/0171520 A1 | 7/2009 | Kaji | |
| 2009/0222154 A1 | 9/2009 | Lopriore | |
| 2010/0228420 A1 | 9/2010 | Lee | |
| 2011/0046843 A1 | 2/2011 | Caveney | |
| 2011/0307128 A1 | 12/2011 | Igarashi et al. | |
| 2012/0130570 A1 | 5/2012 | Pease | |
| 2012/0132120 A1 | 5/2012 | Gai et al. | |
| 2012/0290175 A1 | 11/2012 | Hisanaga | |
| 2013/0173096 A1 | 7/2013 | Chalhoub et al. | |
| 2014/0316657 A1 | 10/2014 | Johnson et al. | |

FOREIGN PATENT DOCUMENTS

| | | |
|---|---|---|
| DE | 19803078 | 7/1999 |
| DE | 19807525 | 9/1999 |
| EP | 2096018 | 9/2009 |
| GB | 1223986 | 3/1971 |
| GB | 1419244 | 12/1975 |
| GB | 2429541 | 2/2007 |
| JP | 2013086745 | 5/2013 |
| WO | WO 2007/002391 | 1/2007 |
| WO | WO 2010/051629 | 5/2010 |
| WO | WO 2014/168674 | 10/2014 |

OTHER PUBLICATIONS

Gierusz et al., "Multivariable Robust Steering of the Ship with Feedforward Controller", IFAC Proceedings Volumes, 2007, pp. 310-314, vol. 40, Issue 17, Elsevier, Amsterdam, Netherlands.

* cited by examiner

PROACTIVE DIRECTIONAL CONTROL SYSTEMS AND METHODS

CROSS-REFERENCE TO RELATED APPLICATIONS

This application is a continuation of International Patent Application No. PCT/US2015/067959 filed Dec. 29, 2015 and entitled "PROACTIVE DIRECTIONAL CONTROL SYSTEMS AND METHODS", which is hereby incorporated by reference in its entirety.

International Patent Application No. PCT/US2015/067959 claims priority to and the benefit of U.S. Provisional Patent Application No. 62/099,032 filed Dec. 31, 2014 and entitled "PROACTIVE DIRECTIONAL CONTROL SYSTEMS AND METHODS", which is hereby incorporated by reference in its entirety.

International Patent Application No. PCT/US2015/067959 is also a continuation-in-part of International Patent Application No. PCT/US2015/015281 filed Feb. 10, 2015 and entitled "ACCELERATION CORRECTED ATTITUDE ESTIMATION SYSTEMS AND METHODS" which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS", all of which are hereby incorporated by reference in their entirety.

International Patent Application No. PCT/US2015/067959 is also a continuation-in-part of International Patent Application No. PCT/US2015/013141 filed Jan. 27, 2015 and entitled "HYDRAULIC SLIP COMPENSATION SYSTEMS AND METHODS" which claims priority to and the benefit of U.S. Provisional Patent Application No. 61/934,678 filed Jan. 31, 2014 and entitled "HYDRAULIC SLIP COMPENSATION SYSTEMS AND METHODS", all of which are hereby incorporated by reference in their entirety.

International Patent Application No. PCT/US2015/067959 also claims priority to and the benefit of U.S. Provisional Patent Application No. 62/099,016 filed Dec. 31, 2014 and entitled "ADAPTIVE TRACK KEEPING SYSTEMS AND METHODS", which is hereby incorporated by reference in its entirety.

International Patent Application No. PCT/US2015/067959 also claims priority to and the benefit of U.S. Provisional Patent Application No. 62/099,022 filed Dec. 31, 2014 and entitled "STABILIZED DIRECTIONAL CONTROL SYSTEMS AND METHODS", which is hereby incorporated by reference in its entirety.

International Patent Application No. PCT/US2015/067959 is also a continuation-in-part of U.S. patent application Ser. No. 14/852,010 filed Sep. 11, 2015 and entitled "WIND SENSOR MOTION COMPENSATION SYSTEMS AND METHODS" which is a continuation of International Patent Application No. PCT/US2014/026725 filed Mar. 13, 2014 and entitled "WIND SENSOR MOTION COMPENSATION SYSTEMS AND METHODS" which claims priority to and the benefit of U.S. Provisional Application No. 61/785,327, filed on Mar. 14, 2013 and entitled "WIND SENSOR MOTION COMPENSATION SYSTEMS AND METHODS," all of which are incorporated herein by reference in their entirety.

International Patent Application No. PCT/US2015/067959 is related to International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS," all of which are incorporated herein by reference in their entirety.

International Patent Application No. PCT/US2015/067959 is also related to U.S. patent application Ser. No. 14/321,646 filed Jul. 1, 2014 and entitled "STABILIZED DIRECTIONAL CONTROL SYSTEMS AND METHODS" which is a continuation of International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS," all of which are incorporated herein by reference in their entirety.

International Patent Application No. PCT/US2015/067959 is related to International Patent Application No. PCT/US2015/015279 filed Feb. 10, 2015 and entitled "MODULAR SONAR TRANSDUCER ASSEMBLY SYSTEMS AND METHODS" which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated by reference in their entirety.

International Patent Application No. PCT/US2015/067959 is also related to International Patent Application No. PCT/US2015/032304 filed May 22, 2015 and entitled "MULTICHANNEL SONAR SYSTEMS AND METHODS" which claims priority to and the benefit of U.S. Provisional Patent Application No. 62/005,838 filed May 30, 2014 and entitled "MULTICHANNEL SONAR SYSTEMS AND METHODS", all of which are hereby incorporated by reference in their entirety.

This application is also a continuation-in-part of U.S. patent application Ser. No. 15/239,760 filed Aug. 17, 2016 and entitled "ACCELERATION CORRECTED ATTITUDE ESTIMATION SYSTEMS AND METHODS" which is a continuation of International Patent Application No. PCT/US2015/015281 filed Feb. 10, 2015 and entitled "ACCELERATION CORRECTED ATTITUDE ESTIMATION SYSTEMS AND METHODS" which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS", all of which are hereby incorporated by reference in their entirety.

This application is also a continuation-in-part of U.S. patent application Ser. No. 15/222,905 filed Jul. 28, 2016 and entitled "HYDRAULIC SLIP COMPENSATION SYSTEMS AND METHODS" which is a continuation of International Patent Application No. PCT/US2015/013141 filed Jan. 27, 2015 and entitled "HYDRAULIC SLIP COMPENSATION SYSTEMS AND METHODS" which claims priority to and the benefit of U.S. Provisional Patent Application No. 61/934,678 filed Jan. 31, 2014 and entitled "HYDRAULIC SLIP COMPENSATION SYSTEMS AND METHODS", all of which are hereby incorporated by reference in their entirety.

This application is also a continuation-in-part of U.S. patent application Ser. No. 15/620,675 filed Jun. 12, 2017 and entitled "ADAPTIVE AUTOPILOT CONTROL SYSTEMS AND METHODS" which is a continuation-in-part of U.S. patent application Ser. No. 14/321,646 filed Jul. 1, 2014 and entitled "STABILIZED DIRECTIONAL CONTROL SYSTEMS AND METHODS" (now U.S. Pat. No. 9,676,464 issued Jun. 13, 2017) which is a continuation of International Patent Application No. PCT/US2014/013441 filed Jan. 28, 2014 and entitled "STABILIZED DIRECTIONAL CONTROL SYSTEMS AND METHODS" which claims priority to and the benefit of U.S. Provisional Patent Application No. 61/759,238 filed Jan. 31, 2013 and entitled "STABILIZED DIRECTIONAL CONTROL SYSTEMS AND METHODS," all of which are incorporated herein by reference in their entirety.

TECHNICAL FIELD

One or more embodiments of the invention relate generally to directional control and more particularly, for example, to systems and methods for proactive directional control for vehicles.

BACKGROUND

Directional control systems and methods are used to provide automated and/or supplemented control for planes, watercraft, and, more recently, automobiles. A significant drawback to conventional directional control systems is that they typically need to be designed and/or configured for a particular vehicle, and once configured, cannot easily be used to provide directional control for a different vehicle. Thus, manufacturing directional control systems and methods for a number of different vehicles, even if they are of the same type, such as different makes of ships, can be expensive due to extensive testing and adjustment procedures performed for each individual vehicle.

Adaptive control techniques have been developed to address manually performing the adjustment and testing procedures, but conventional adaptive techniques typically take too long to train to a particular vehicle dynamic under normal operating conditions. Furthermore, conventional adaptive techniques typically train to a very limited set of vehicle states and or dynamics, and directional controllers based on these techniques are known to drastically lose their accuracy and/or stability as conditions vary even subtly outside previous training conditions.

In addition, even advanced adaptive directional control techniques typically fail to address disturbances effecting directional control proactively, and so common interactions with a real world environment (e.g., gusts of wind, waves on an ocean, ruts in a road) can relatively easily result in unsafe conditions for a mobile structure controlled by an autopilot. Thus, there is a need for improved proactive directional control methodologies.

SUMMARY

Techniques are disclosed for systems and methods to provide proactive directional control for a mobile structure. In accordance with one or more embodiments, a directional control system may include a logic device, a memory, one or more sensors, one or more actuators/controllers, and modules to interface with users, sensors, actuators, and/or other modules of a mobile structure. The logic device may be adapted to determine a steering angle disturbance estimate based on environmental conditions associated with the mobile structure, and the feed forward disturbance correction may be used adjust a directional control signal provided to an actuator of the mobile structure. The logic device may also be adapted to receive directional data about a mobile structure and determine nominal vehicle feedback from the directional data, which may be used to adjust and/or stabilize the directional control signal provided to the actuator. Various types of control signals may be displayed to a user and/or used to adjust a steering actuator, a propulsion system thrust, and/or other operational systems of the mobile structure.

In various embodiments, a proactive directional control system may include a logic device configured to receive one or more sensor signals and generate one or more control signals to provide proactive directional control for a mobile structure. The logic device may be configured to receive a steering demand for the mobile structure, wherein the steering demand is based, at least in part, on a heading of the mobile structure; determine a steering angle disturbance adjustment based, at least in part, on the heading and one or more environmental conditions associated with the mobile structure; and determine a disturbance adjusted steering demand based, at least in part, on the steering angle disturbance adjustment and the steering demand.

In some embodiments, a method may include receiving a steering demand for a mobile structure, wherein the steering demand is based, at least in part, on a heading of the mobile structure; determining a steering angle disturbance adjustment based, at least in part, on the heading and one or more environmental conditions associated with the mobile structure; and determining a disturbance adjusted steering demand based, at least in part, on the steering angle disturbance adjustment and the steering demand.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
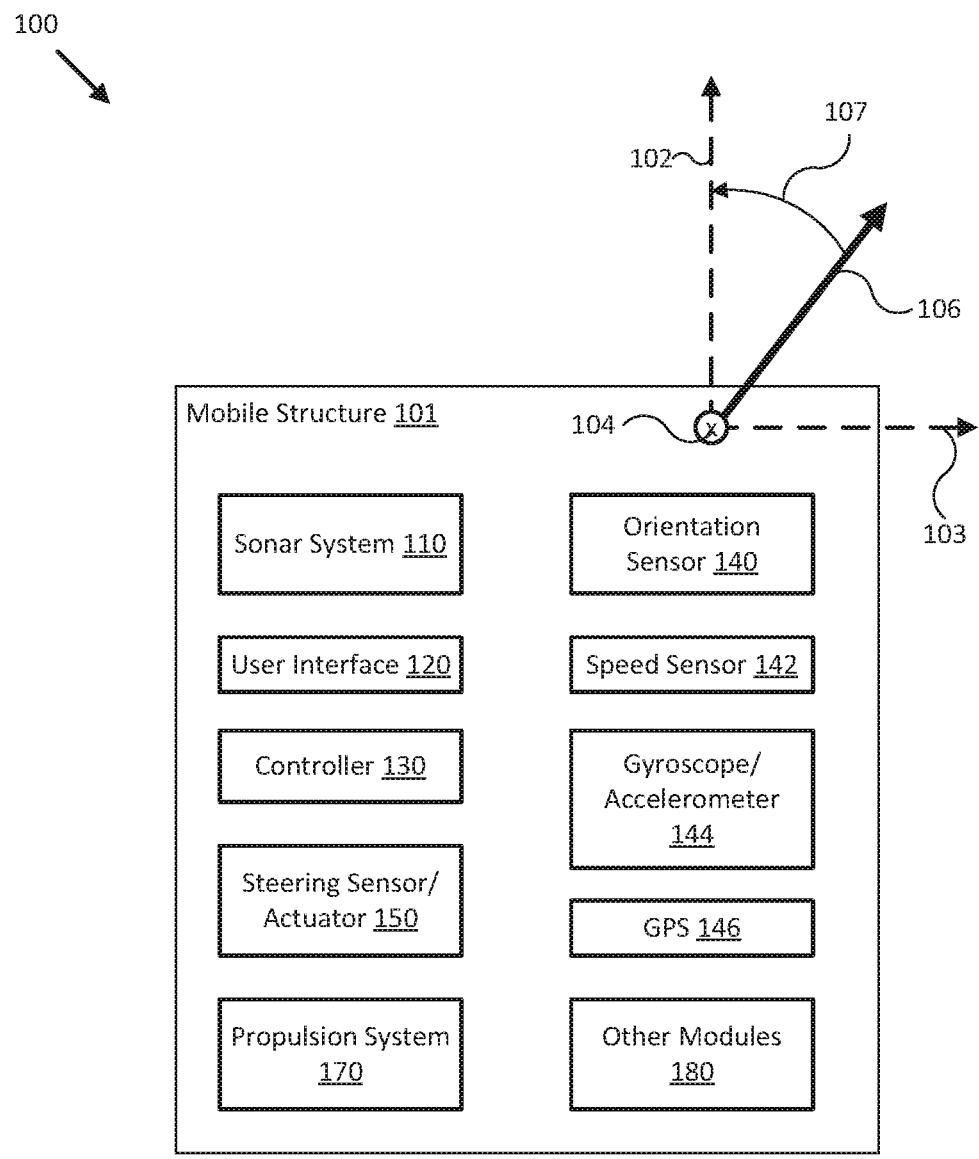
FIG. 1A illustrates a block diagram of a mobile structure including a directional control system in accordance with an embodiment of the disclosure.

In accordance with various embodiments of the present disclosure, adaptive nominal vehicle model-based autopilot systems and methods may provide proactive directional control for mobile structures that is substantially more reliable and accurate than conventional systems across a wide variety of types of structures and environmental conditions. For example, the most common type of conventional directional controller is a proportional-derivative-integral (PID) controller. The integral portion of the PID controller attempts to correct for steady state disturbances, but it is typically insufficient for a number of common environmental conditions.

For example, on a sailboat that is heeled over while sailing upwind, the sails drive the boat into the wind, and the skipper typically needs to hold around five degrees of weather helm (e.g., additional steering angle counteracting the force of the wind/slip angle of the boat) to keep the boat from luffing up. One problem with integral action is that it lags the actual conditions measured with respect to the boat, and this lag destabilizes the PID control loop enough to make the resulting autopilot control oscillatory and at least uncomfortable for a user, particularly under conditions where holding a weather helm is necessary. Another problem is that integral action generates overshoot to a step input (e.g., such as when changing from waypoint to waypoint in a route), and so a conventional PID controller attempting to autopilot through a tacking maneuver will overshoot the new heading due to the error in the PID controller that arises when the steering demand suddenly changes by approximately ninety degrees, and that overshoot can destabilize the entire tacking maneuver. Even under the most common environmental conditions, the parameters/gains for the PID controller typically need to be carefully adjusted for each individual boat and, in some instances, for each environmental condition experienced by the boat, before the PID controller can be used to autopilot that boat comfortably and/or safely.

One or more embodiments of the described directional control system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops including a disturbance model and/or a nominal vehicle feedback system.

The disturbance model may be configured to receive various environmental sensor data, detect environmental conditions corresponding to a disturbance in the directional control of a mobile structure, and provide a steering offset to preempt the detected disturbance in the motion of the mobile structure, as described herein. The nominal vehicle feedback system may be configured to receive measured or modeled sensor signals, such as a steering angle and a steering rate for a mobile structure, and provide a nominal vehicle feedback signal, as described herein. Such sensors may be mounted to or within the mobile structure (e.g., a watercraft, aircraft, motor vehicle, and/or other mobile structure), or may be integrated with a controller. Various embodiments of the present disclosure may be configured to automatically coordinate steering actuator operations with various orientation and/or position measurements to provide relatively high quality, low noise, and proactive directional control.

As an example, FIG. 1A illustrates a block diagram of system 100 in accordance with an embodiment of the disclosure. In various embodiments, system 100 may be adapted to provide directional control for a particular mobile structure 101. Directional control of a mobile structure may refer to control of any one or combination of yaw, pitch, or roll of mobile structure 101. In some embodiments, system 100 may be adapted to measure an orientation, a position, an acceleration, and/or a speed of mobile structure 101. System 100 may then use these measurements to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide directional control for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiment, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for steering sensor/actuator 150 and/or propulsion system 170 to cause mobile structure 101 to move according to the target heading, waypoint, route, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), and Economy (slow response) responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of steering sensor/actuator 150, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops for actuated device control, steering control (e.g., using steering sensor/actuator 150 and/or propulsion system 170) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GPS 146, a measured steering angle from steering sensor/actuator 150, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand based on one or more of the received sensor signals, including the user input, and provide the steering demand to steering sensor/actuator 150.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, such as control signals from a proportional, proportional-derivative, and/or proportional-derivative-integral controller module (e.g., implemented as a portion of controller 130) also forming a portion of the control loop, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

Figure 1B:
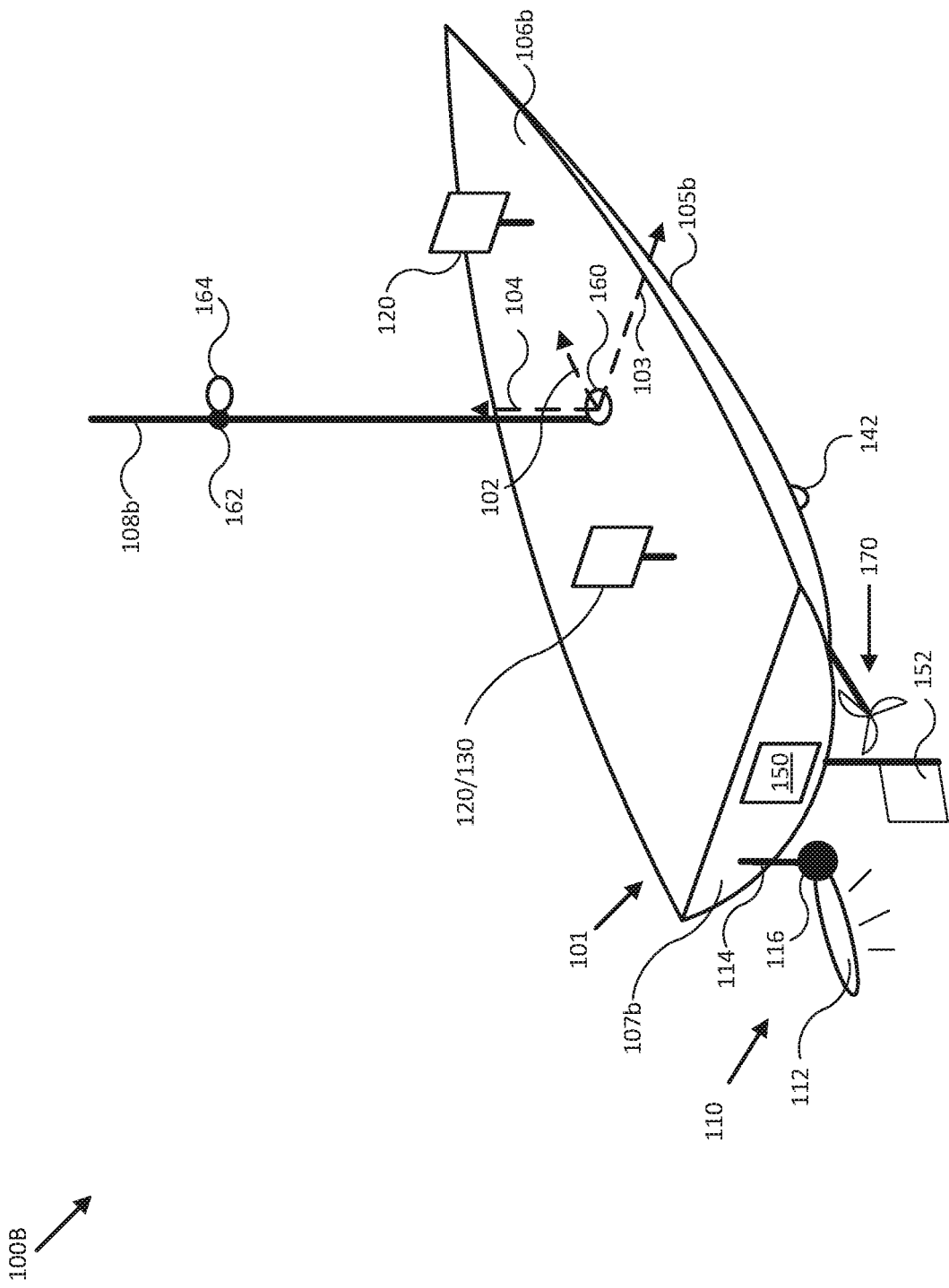
FIG. 1B illustrates a diagram of a watercraft including a directional control system in accordance with an embodiment of the disclosure.
Figure 1C:
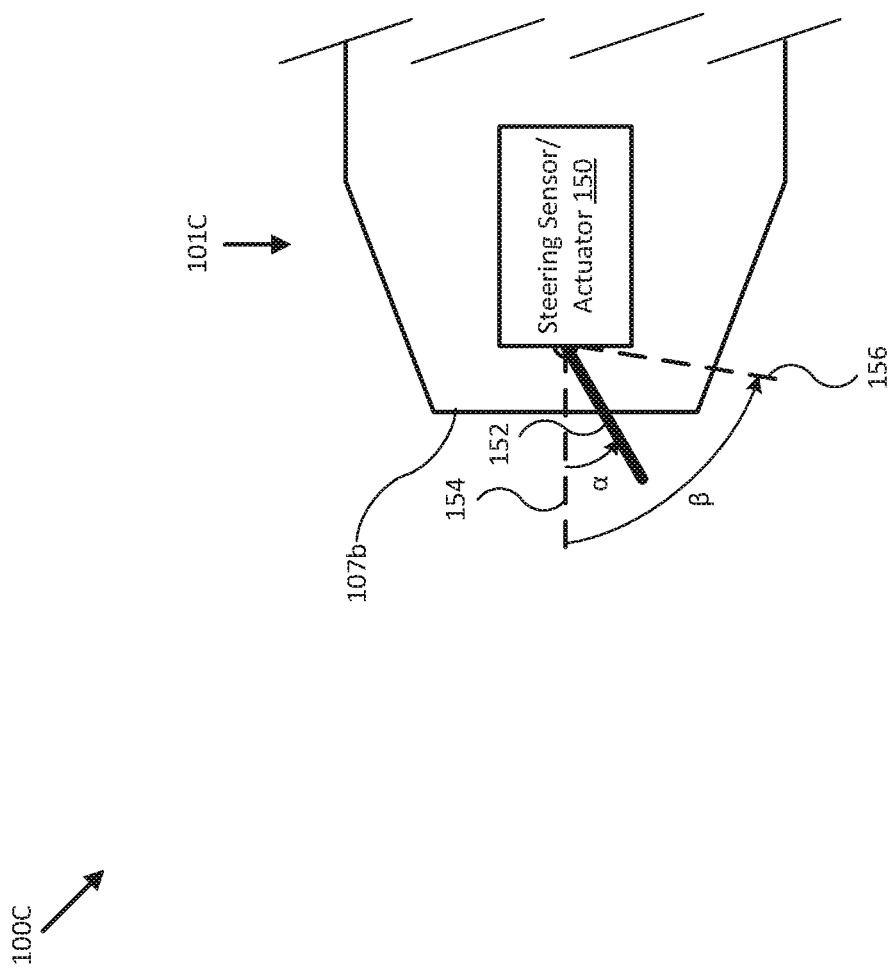
FIG. 1C illustrates a diagram of a rear portion of a watercraft including a directional control system in accordance with an embodiment of the disclosure.

For example, FIG. 1C illustrates a diagram 100C of a rear portion of a watercraft including a directional control system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 154). In various embodiments, steering sensor/actuator 150 may be implemented with a steering actuator angle limit (e.g., the positive limit is designated by an angle $\beta$ and a dashed line 156 in FIG. 1C), and/or a steering actuator rate limit "R".

For example, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 122, speed sensor 124, and/or GPS 126, for example.

In various embodiments, steering sensor/actuator 150 may be implemented as a number of separate sensors and/or actuators, for example, to sense and/or control a one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular directional control maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle $\alpha$ to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 from various sensors, to determine a steering error or demand related to the sensor signals, and/or to control steering sensor/actuator 150 and/or other actuators or elements of system 100 to adjust operation of system 100 accordingly, for example, as described herein. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide directional control and/or other operational control of mobile structure 101, similar to system 100 of FIG. 1B. For example, system 100B may include integrated user interface/controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, an actuated sonar system 110 coupled to transom 107b, and an actuated device 164 (e.g., a camera, spotlight, or other actuated device or sensor) coupled to mast/sensor mount 108b though roll, pitch, and/or yaw actuator 162. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of actuated device 164 according to control signals and/or an orientation or position of mobile structure 101 provided by user interface/controller 120/130. For example, user interface/controller 120/130 may be adapted to receive an orientation of transducer assembly 112 and/or actuated device 164 (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

When a mobile structure is subjected to a wind or sea disturbance, a steering error can follow some moments later. Steering control can be improved by measuring disturbances directly or indirectly, anticipating the impending effect, and correcting immediately (e.g., before or at substantially the same time the mobile structure reacts to the disturbance). For example, in one embodiment, pitch data may be used to establish where a watercraft is in a wave pattern and to generate corresponding steering corrections. Other or additional corrections may be generated from heel/roll angle (and, for sailboats, wind gusts), which can also create disturbances.

Autopilots typically use feedback control to correct in response to a measured error, such as a heading error, a wind angle error, or an off track error/distance. By contrast, an experienced human pilot takes into account other factors (e.g., roll angle, wind gusts, pitch angle, position in the wave cycle, and/or other environmental conditions or states) to anticipate motion of the mobile structure, and the pilot applies corrective action before the mobile structure has deviated substantially from a target heading or orientation. To improve course keeping performance of autopilots, feed-forward controller terms are beneficial to bring autopilot steering up near to the capability of an experienced pilot.

A major hurdle to implementing such proactive algorithms is that every type of mobile structure behaves differently from others, and even the behavior of a single mobile structure may vary during different states of the mobile structure (e.g., when an engine is started or a sail is reefed). Furthermore, autopilots have traditionally been user calibrated with a plethora of demands placed on the user to optimize performance by setting a variety of controller gains directly or indirectly. The challenge is to automatically determine how much steering angle to apply in response to a gust, wave, pitch angle, roll angle, or other disturbance, in a context where every mobile structure (e.g., every watercraft) has a unique time varying response characteristic.

Ocean waves can be modeled using the linear superposition of sine waves with different frequencies, amplitudes, lengths, phase, and direction of propagation, for example. Because density, gravity and viscosity can be taken as physical constants, waves can be described according to a limited number of certain characteristics, and only a subset significantly impact directional control of a watercraft. One such characteristic is the orbital velocity of water particles in a wave near the surface (e.g., in a range that interacts with hull 105b, rudder 152, and/or propulsion system 170 of mobile structure 101.

Figure 2A:
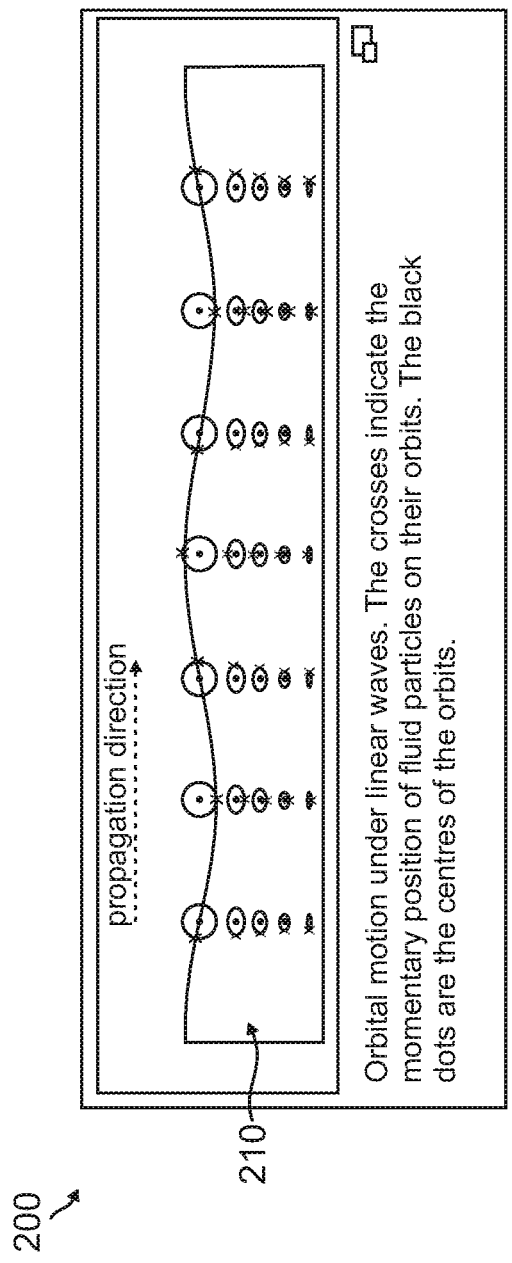
FIG. 2A illustrates a distribution of orbital velocity of water in a wave in accordance with an embodiment of the disclosure.

FIG. 2A illustrates a distribution of orbital velocity of water in a wave in accordance with an embodiment of the disclosure. For example, as shown in diagram 200 of FIG. 2, water particles 210 have the most pronounced orbital velocity if they are near the surface, and the leading and trailing slopes of each wave tends to draw flow towards the crest of the wave.

Figure 2C:
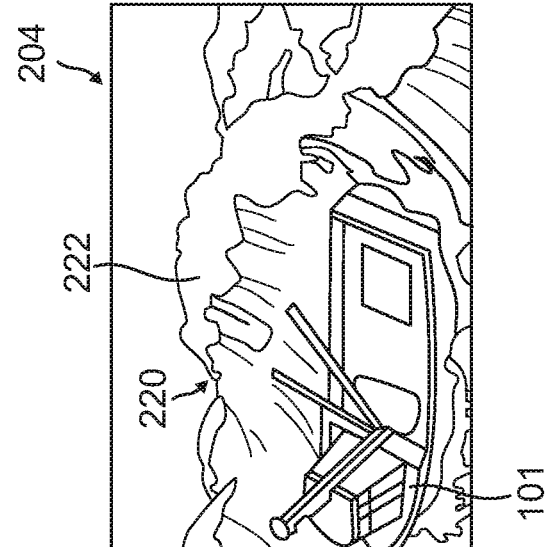
FIG. 2C illustrates a mobile structure oriented to head across a wave in accordance with an embodiment of the disclosure.
Figure 2B:
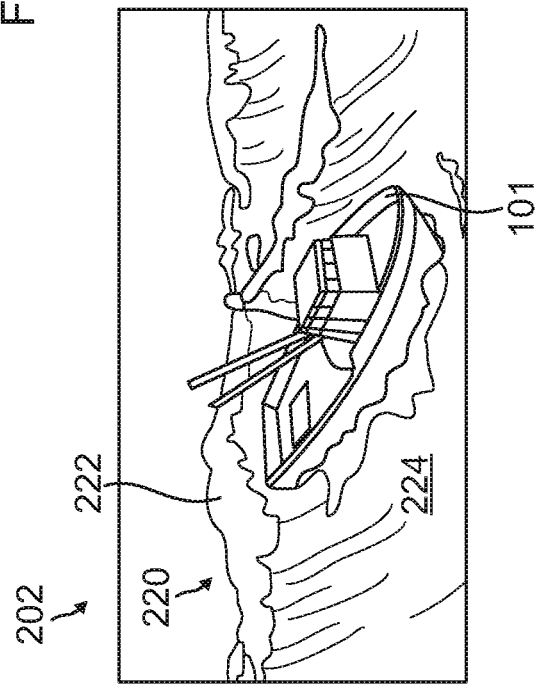
FIG. 2B illustrates a mobile structure oriented to head down a wave in accordance with an embodiment of the disclosure.

Orbital motion is particularly important because it can affect flow over a watercraft's rudder and cause steering difficulties when navigating following seas, such as that shown in FIG. 2B, and particularly in quartering seas, such as that shown in FIG. 2C. FIG. 2B includes diagram 202 illustrating mobile structure 101 oriented to head down a wave 220 and into trough 224, in accordance with an embodiment of the disclosure. FIG. 2C includes diagram 204 illustrating mobile structure 101 oriented to head across wave 220 and into trough 224, in accordance with an embodiment of the disclosure.

The difficulty in such circumstances is that the flow over a rudder may be modified by the orbital motion/velocity, which can have the combined effect of pushing the watercraft off course and slowing the flow over the rudder, thereby reducing the rudder's ability to steer mobile structure 101. A skilled helmsman anticipates and corrects for these effects, but autopilots (or novice helmsmen) suffer occasional broaches where the wave violently and dangerously forces the boat side on to the propagation direction of the wave (e.g., see mobile structure 101 in FIG. 2C).

Using an attitude and heading reference system (AHRS) (e.g., orientation sensor 140 and/or gyroscope/accelerometer 144), it is possible to determine wave height. Wave height may be determined by double integration of a vertical acceleration measured by gyroscope/accelerometer 144, for example, and, in some embodiments, determining a bias, drift, or offset in the measurements and compensating for or removing them from the resulting calculated height. For example, in various embodiments, such integration may be implemented and/or operated according to any one or combination of the systems and methods described in International Patent Application No. PCT/US2014/26725 filed Mar. 13, 2014 and entitled "WIND SENSOR MOTION COMPENSATION SYSTEMS AND METHODS," which is incorporated herein by reference in its entirety.

For shallow water, knowing the height, and knowing the depth of the sea bed under the watercraft (e.g., determined using an echo sounder and/or sonar system 110), the horizontal component of the orbital velocity may be may be proportional to A*sqrt(g/depth), where A is the wave amplitude (half the wave height), and g is the acceleration of gravity on Earth (~9.81). For example in 10 m of water, long waves (e.g., >200 m with >11 s period and 2 m height), would have a horizontal velocity of approximately 1 m/s.

For shorter waves or deeper water, the formula is more complex and wave characterization may instead correspond to the timing of the interval between waves (e.g., points of equal pitch for a watercraft). The watercraft's speed is relevant because the encounter frequency is a function of both the wave phase speed and the watercraft's speed. From this basis, a set of equations which link encounter frequency (or period) to wave frequency (or length) may be determined. These equations may be based on the wave formula: y=a*sin(wt+kx), where k is the wave number and x is the horizontal displacement, and on the gravity wave relationship: lambda=2*pi*g/w^2, where lambda is the wavelength and g is the acceleration of gravity. These equations generate two possible solutions for wave characterization, which can be used to estimate characteristics of the wave and its corresponding orbital motion.

Figure 3:
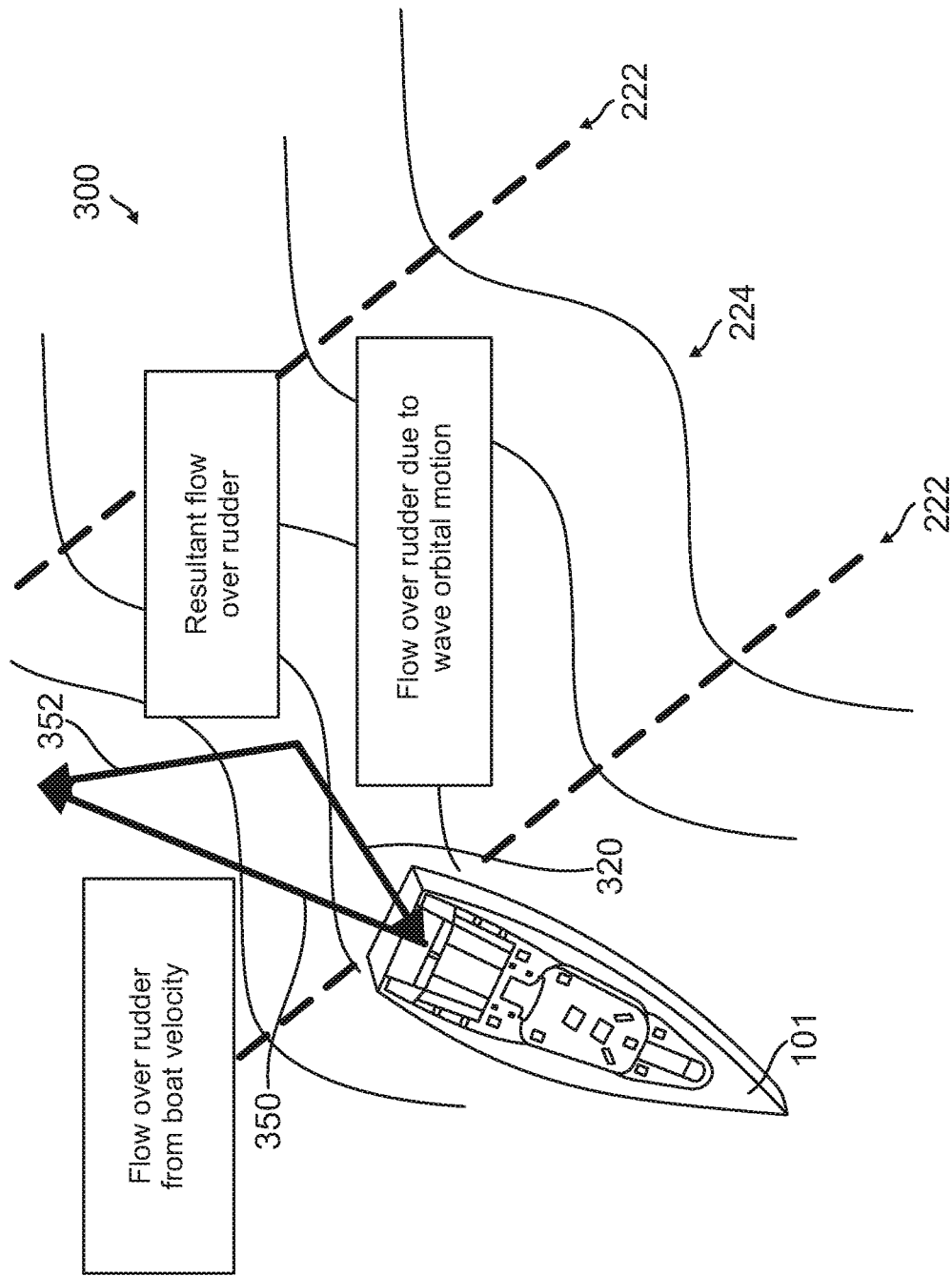
FIG. 3 illustrates a wave based disturbance of a mobile structure in accordance with an embodiment of the disclosure.

The estimated orbital motion (e.g., speed and direction) may be combined with the watercraft's speed in a vector triangle to obtain a relative flow direction over the watercraft's rudder. FIG. 3 illustrates a wave based disturbance of mobile structure 101 in accordance with an embodiment of the disclosure. As shown in FIG. 3, mobile structure 101 is experiencing net rudder flow 352 corresponding to the sum of its velocity 350 (e.g., heading and/or speed over ground) and the wave orbital motion 320 corresponding to the position of rudder 152 of mobile structure 101 with respect to crest 222 and trough 224. As can be seen from FIGS. 2A and 3, the difficult point in the wave cycle is just before the crest of the wave, where there is a lower flow speed at the rudder, thereby reducing the rudder's effectiveness, and a flow direction against the watercraft that pushes the watercraft across the wave, potentially causing a broach.

To counteract this disturbance, a disturbance model may be configured to feed an autopilot controller a continuously varying zero offset term (e.g., a directional bias of the steering angle, or a steering angle disturbance adjustment/estimate) corresponding to the angle between net rudder flow 352 and velocity 350 of FIG. 3 so that a neutral rudder (e.g., a steering angle where the heading and/or orientation of mobile structure 101 stays constant while mobile structure 101 is in motion) is related to local water flow. For example, the disturbance model may be configured to characterize the wave to determine and/or estimate orbital motion at rudder 152 and determine net rudder flow 352 accordingly. The disturbance model may then be configured to determine the steering angle disturbance adjustment/estimate based on net rudder flow 352 and provide the steering angle disturbance adjustment/estimate to the autopilot controller, as described herein. Furthermore, should it be considered safer or more fuel efficient to steer down the wave (e.g., towards trough 224), the autopilot controller may be configured to use the steering angle disturbance adjustment/estimate provided by the disturbance model to do so.

Figure 4:
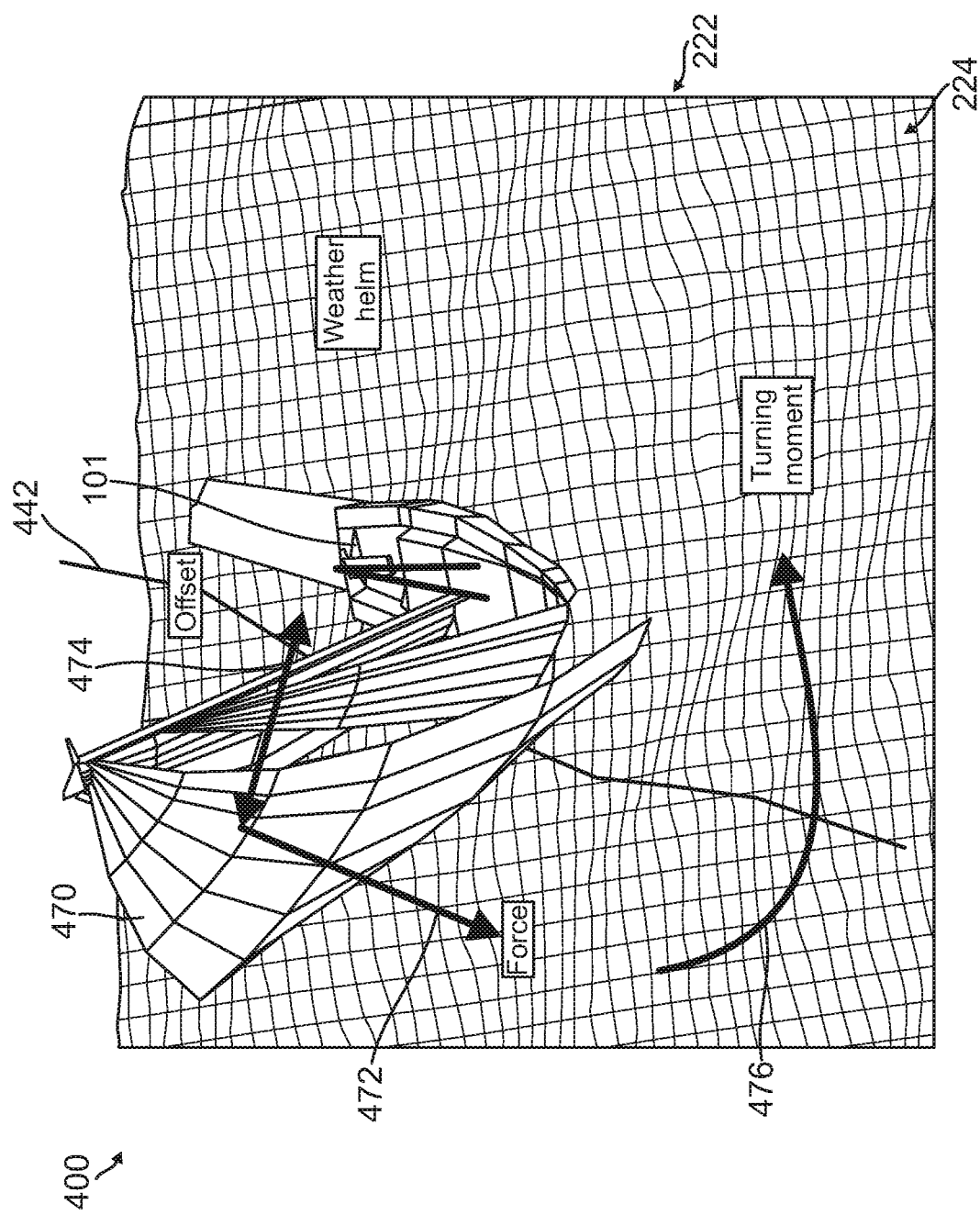
FIG. 4 illustrates a heel or roll based disturbance of a mobile structure in accordance with an embodiment of the disclosure.

Some disturbances are specific to specific types of mobile structures. For example, sail powered mobile structures, such as sailboats, may experience multifaceted disturbance when wind causes the orientation of the sailboat to change. FIG. 4 includes diagram 400 illustrating a heel or roll based disturbance of a sailboat 101 caused by wind 442 in accordance with an embodiment of the disclosure. As shown in FIG. 4, sailboat 101 includes sail 470 and is traveling over crest 222 and into trough 224 under motive force 472 provided by interaction between sail 470 and wind 442.

The collective effect of the forces on the sail-plan of sailboat 101 can be considered as force 472 acting at a center of effort (e.g., typically within the envelope of sail 470 and where it attaches to sailboat 101). When sailboat 101 heels (e.g., rolls), the center of effort experiences an offset 474 from the center of resistance (e.g., the flow of water under the hull/keel), and this creates a turning moment 476 (e.g., a yaw), to which the helmsman or autopilot must react with weather helm. In various embodiments, the weather helm may refer to an offset in steering angle selected to counteract a disturbance that would otherwise cause mobile structure 101 to turn. If the wind speed or the heel angle increases, or the wind direction changes, then more weather helm may be required to maintain a heading of mobile structure 101. In both sail and power boats, the asymmetry of a heeled/rolled hull causes a similar effect and must also be counteracted if a heading for mobile structure 101 is to be maintained. A feed forward disturbance model can improve steering over simple error feedback autopilot controllers by applying more helm immediately, in the form of a steering angle disturbance adjustment/estimate, so long as the disturbance model has access to measurements of roll angle and wind speed/direction and can reliably determine and/or estimate the relationship between gust/roll and weather helm for mobile structure 101.

Such relationship can be difficult to estimate because the amount of weather helm may be dependent on many variables (e.g., mast height, sail area, rudder size, and/or other characteristics of mobile structure 101). One solution is adaptively learning the relationship by recording various environmental sensor data and states for mobile structure 101, which builds up a statistical picture/histogram of the relationship through observation of the boat's response over time. However, since yacht designers build boats to have the right 'feel' (e.g., weather helm to roll relationship) for safe and/or generally comfortable and stable travel, the actual variability in the field is relatively low. As such, another solution is to construct a feed-forward disturbance model and/or controller based on a typical relationship and use that typical relationship as a basis for controlling multiple mobile structures.

A preferred solution is to use a steady state standing helm (e.g., a bias or trim) as a gain value in the simplified formula: RudderAngleOffset=K*sin(phi)W^2, where K is a gain, phi is the roll angle, and W may be the component of the apparent wind speed that is substantially perpendicular to the heading of mobile structure 101. In some embodiments, the RudderAngleOffset may correspond to a steering angle disturbance adjustment/estimate or a component of a steering angle disturbance adjustment/estimate provided by a feed forward disturbance model. Such relationship can be simplified to an equation involving only the roll angle by assuming that wind loading on the sails is proportional to the sine of the roll angle and by using the small angle approximation sin(phi)~=phi: RudderAngleOffset=K*(phi)^2. In various embodiments, such feed forward solutions (e.g., provided by a feed forward disturbance model) may be used in conjunction with a feedback controller to address errors in the feed-forward model and other un-modeled factors, as described herein.

All of the above rudder angle feed-forward demands (e.g., the steering angle disturbance adjustments/estimates) can be implemented and/or integrated with an adaptive feedback controller. In one embodiment, various components of the feed-forward signals are added to create a steering angle disturbance estimate, and the steering angle disturbance estimate is combined with a feedback controller signal to create an overall rudder demand that is provided to steering sensor/actuator 150.

In various embodiments, a disturbance model may be configured to use AHRS data, such as pitch information for mobile structure 101, to determine various wave characteristics (e.g., height, length, period, propagation direction), in addition to a heading for mobile structure 101, to determine the position of mobile structure 101 in the wave cycle (e.g., crest or trough or intermediate, following or approaching) and the orbital velocity of the wave at rudder 152. In some embodiments, a disturbance model may be configured to use roll angles to determine the relative heading to the wave propagation direction. In other embodiments, a lateral speed for mobile structure 101 (e.g., wave induced sway) can be derived from wave characteristics and a heading for mobile structure 101.

With knowledge of the water velocity under the rudder, and the boat's position in the wave cycle, a disturbance model and/or an autopilot incorporating a disturbance model may be configured to apply corresponding steering corrections, such as using the wave velocity in a vector triangle with the speed to determine a local neutral flow angle at rudder 152 and correcting the neutral rudder angle in the autopilot accordingly. In some embodiments, an autopilot may be configured to use such information to providing a further steering angle disturbance adjustment and/or to steer down a wave. More generally, operation of an autopilot may include using nominal vehicle feedback to normalize piloting dynamics and create a robust feed forward adaptive directional controller, as described herein.

In other embodiments, a disturbance model and/or autopilot controller may be configured to use AHRS data such as roll angles along with wind sensor data (e.g., wind speed and/or direction) to determine a steering angle disturbance estimate and to apply the steering angle disturbance estimate (e.g., in the form of a weather helm component) as a function of heel/roll angle and wind speed, based on a typical wind speed/roll/turn moment mathematical relationship, as described herein. In some embodiments, a disturbance model and/or autopilot controller may be configured to store such data, along with corresponding states for mobile structure 101, over time, and determine a statistical relationship between stored weather helm components and stored wind speeds, wind directions, and/or series of roll angles, to determine or refine the mathematical relationship. As noted above determining such relationship may in some embodiments include using nominal vehicle feedback to normalize piloting dynamics and create a flexible and accurate feed forward adaptive directional controller.

Figure 5:
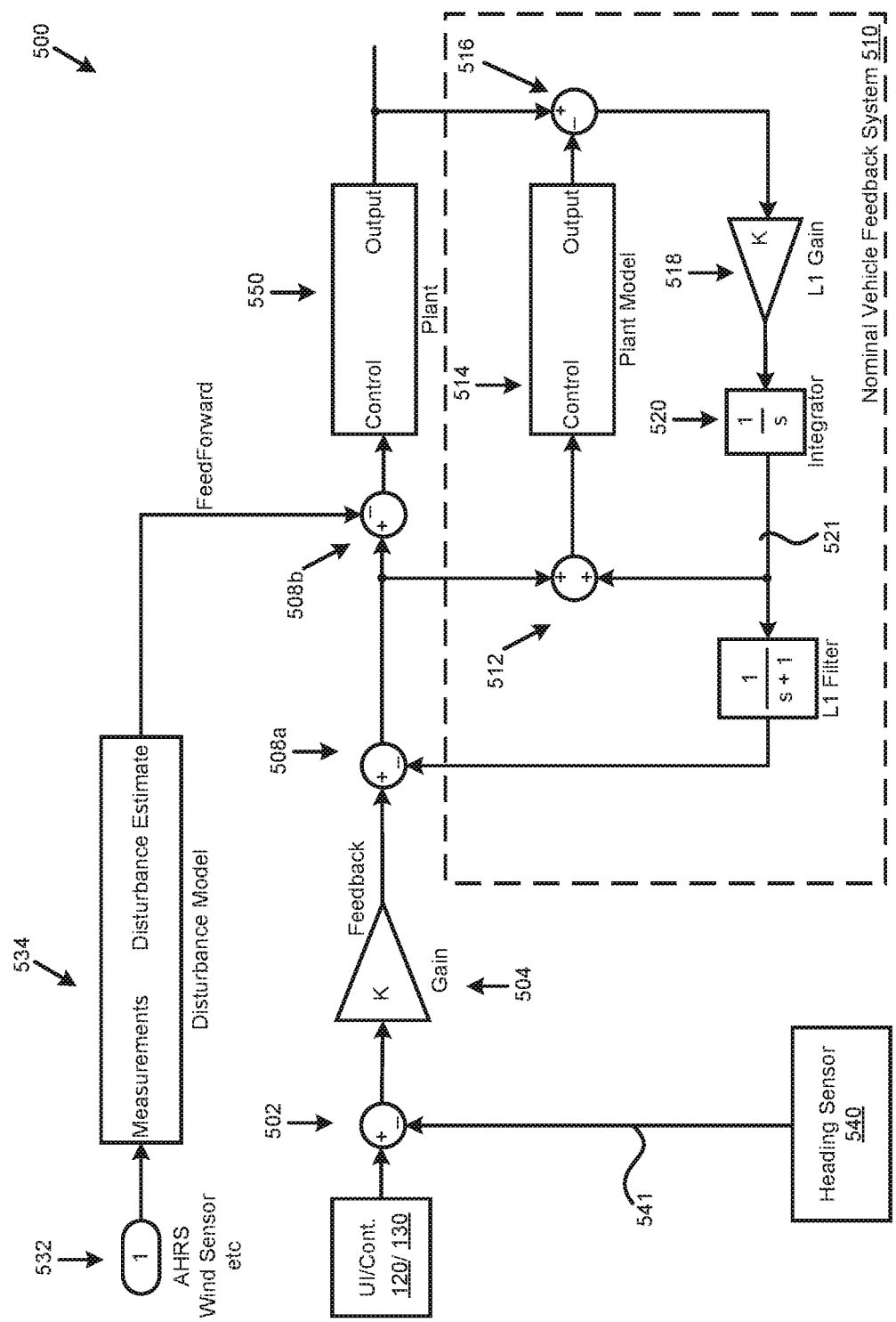
FIG. 5 illustrates a flow diagram of a control loop to provide proactive directional control in accordance with an embodiment of the disclosure.

FIG. 5 illustrates a flow diagram of a control loop 500 to provide stabilized directional control in accordance with an embodiment of the disclosure. In some embodiments, the operations of FIG. 5 may be performed by controller 130 processing and/or operating on measurements (e.g., sensor signals) received from one or more of sensors 140-146, steering sensor/actuator 150, propulsion system 170, user interface 120, and/or other modules 180. For example, in various embodiments, control loop 500 (and/or control loop 600 of FIG. 6) may be implemented and/or operated according to any one or combination of the systems and methods described in International Patent Application No. PCT/US2014/013441 filed Jan. 28, 2014 and entitled "STABILIZED DIRECTIONAL CONTROL SYSTEMS AND METHODS," and/or U.S. patent application Ser. No. 14/321,646 filed Jul. 1, 2014 and entitled "STABILIZED DIRECTIONAL CONTROL SYSTEMS AND METHODS," U.S. Provisional Patent Application No. 62/099,016 filed Dec. 31, 2014 and entitled "ADAPTIVE TRACK KEEPING SYSTEMS AND METHODS", and/or U.S. Provisional Patent Application No. 62/099,022 filed Dec. 31, 2014 and entitled "STABILIZED DIRECTIONAL CONTROL SYSTEMS AND METHODS", each of which is hereby incorporated by reference in their entirety.

Each block may be implemented entirely as instructions executed by controller 130, for example, or may be implemented in a combination of executable instructions and hardware. It should be appreciated that any step, sub-step, sub-process, or block of control loop 500 may be performed in an order or arrangement different from the embodiment illustrated by FIG. 5. For example, although control loop 500 includes block 504, in other embodiments, block 504 may not be present. In various embodiments, control loop 500 may include various aspects of control loop 600 of FIG. 6.

In block 502, controller 130 receives a target heading from user interface/controller 130 and a measured heading 541 from heading sensor 540 and combines them to produce an error output that is then provided to block 504. For example, controller 130 may be adapted to receive a target heading as user input from user interface 120 and measured heading 541 as a sensor signal provided by, for example, orientation sensor 140. In other embodiments, heading sensor 540 may be implemented as one or more of sensors 140-146 and/or other modules 180. In some embodiments, the error output may represent a difference between a target heading and measured heading 541.

In block 504, controller 130 uses and/or executes, for example, a gain module to receive the error output of block 502 and provide a steering demand to block 508a. Various parameters (e.g., a gain) of block 504 may be used to determine the steering demand output by block 504. In some embodiments, block 504 may be implemented as a proportional-derivative-integral controller with one or more of the corresponding gain terms (e.g., proportional, derivative, and/or integral) set to zero. In one embodiment, parameters of the proportional-derivative controller module may be managed to produce a critically damped response with a time constant of 6*Tn (e.g., where Tn is defined herein) and with a damping ratio of 1.25, for example, to sufficiently tune the proportional-derivative controller module for relatively high vehicle speeds. In further embodiments, controller 130 may be configured to modify one or more of the gain terms and/or other parameters of block 504 based on adaptive training of control loop 500, as described herein.

In block 508a, controller 130 receives a steering demand from block 504 and a filtered nominal vehicle feedback signal from block 522 and combines them to produce a feedback adjusted steering demand that is then provided (e.g., as a controller signal) to steering sensor/actuator 130.

In some embodiments, the feedback adjusted steering demand may represent a difference between the steering demand and the filtered nominal vehicle feedback signal. In further embodiments, the filtered nominal vehicle feedback signal from block 522 may be an initial condition set for block 522. In still further embodiments, the filtered nominal vehicle feedback signal from block 522 may be determined by nominal vehicle feedback system 510 using measured inputs, such as from plant 550 (e.g., which may correspond to steering sensor/actuator 150 and/or a steering rate sensor).

In block 508b, controller 130 receives a feedback adjusted steering demand from block 508a and steering angle disturbance estimate from block 534 and combines them to produce a disturbance adjusted steering demand that is then provided (e.g., as a controller signal) to plant 550. In some embodiments, adjusted steering demand 409 may represent a difference between the feedback adjusted steering demand and the steering angle disturbance estimate. In still embodiments, the filtered nominal vehicle feedback signal from block 522 may be determined by nominal vehicle feedback system 510 using measured inputs.

In block 534, controller 130 receives one or more environmental sensor signals from input 532 and determines a steering angle disturbance estimate that is then provided to block 508b. In some embodiments, the steering angle disturbance estimate may include one or more components, such as a rudder trim component configured to compensate for an orbital velocity of water near rudder 152, for example, or a weather helm component configured to compensate for a turning moment caused by roll of mobile structure 101 associated with wind blowing across mobile structure 101. In various embodiments, block 534 may be implemented as a feed forward disturbance model configured to determine the steering angle disturbance adjustment based, at least in part, one or more environmental conditions associated with mobile structure 101, such as wind blowing across a body of water, for example, or a wave pattern on a body of water.

In one embodiment, controller 130 may be configured to determine a wave height, length, period, and/or propagation direction for a wave pattern based, at least in part, on a series of pitch angles for mobile structure 101. Controller 130 may be configured to determine an orbital velocity associated with water at rudder 152 based, at least in part, on the wave characteristics, and to determine a corresponding rudder trim component of the steering angle disturbance adjustment. In some embodiments, controller 130 may be configured to determine the propagation direction for the wave pattern based, at least in part, on a series of roll angles of mobile structure 101 (e.g., provided by orientation sensor 140 and/or gyro/accelerometer 144). Controller 130 may derive a lateral speed from the propagation direction, for example, and include that in the rudder trim component. In other embodiments, controller 130 may be configured to steer mobile structure in the propagation direction for the wave pattern in order to steer down a wave.

In another embodiment, controller 130 may be configured to receive one or more wind speeds, wind directions, and/or a series of roll angles for mobile structure 101 corresponding to the wind speeds and/or wind directions, for example, and to determine at least one weather helm component of the steering angle disturbance adjustment based, at least in part, on the heading, and/or a mathematical relationship between the weather helm components and the wind speeds, wind directions, and/or series of roll angles. In some embodiments, the mathematical relationship may be provided by a user or a manufacturer. In other embodiments, controller 130 may be configured to determine and/or refine the mathematical relationship, particular to mobile structure 101, by storing the wind speeds, the wind directions, the series of roll angles, and/or the weather helm components and determining a statistical relationship (e.g., a histogram and/or other statistical relationship) between the stored weather helm components and the wind speeds, wind directions, and/or series of roll angles, to determine and/or refine the mathematical relationship.

In block 512, controller 130 receives a feedback adjusted steering demand from block 508a and a nominal vehicle feedback signal from block 520 and combines them to produce a feedback adjusted steering angle that is then provided to block 514. In some embodiments, the feedback adjusted steering angle may represent a difference between the feedback adjusted steering demand and the nominal vehicle feedback signal. In further embodiments, the nominal vehicle feedback signal from block 520 may be an initial condition set for block 220. In still further embodiments, the nominal vehicle feedback signal from block 520 may be determined by nominal vehicle feedback system 510 using measured inputs, as described herein.

In block 514, controller 130 uses and/or executes a nominal vehicle predictor to receive, process, and/or operate on an feedback adjusted steering angle from block 512 and provide a nominal vehicle steering rate to block 516. In some embodiments, the nominal vehicle predictor may be implemented as a transfer function (e.g., in the S-plane) adapted to model dynamics of a nominal vehicle derived, at least in part, from a selection of vehicles, as described herein. In one embodiment, the transfer function may be implemented in the form of a ratio of a nominal vehicle steering rate gain term "Kn" to a nominal vehicle steering rate lag term "1+Tn*s", as described herein.

For example, the nominal vehicle steering rate gain term "Kn" may be equal to the ratio (steering rate)/(steering angle), which models the amount of steering rate (e.g., yaw rate, in some embodiments) achieved for a nominal vehicle for each degree of steering angle. In some embodiments, the nominal vehicle steering rate gain term "Kn" may be corrected by the nominal vehicle steering rate lag term "1+Tn*s", which models the time (e.g., in Tn seconds) for the steering rate to develop after application of the steering angle. In some embodiments, control loop parameters Kn and/or Tn may be dependent on a speed of the nominal vehicle in a medium, such as air or water. In such embodiments, the speed of the controlled vehicle may be used as the speed of the nominal vehicle. In other embodiments, the transfer function may be implemented as a different function according to a particular type of nominal vehicle being modeled, a type of steering mechanism being controlled, and/or a type of control loop being implemented.

In some embodiments, Kn and Tn may be set to respective mean values of a population of vehicles to be controlled, for example, as a function of speed. In other embodiments, Kn may be set to exceed a majority of and/or all K values of a population of vehicles to be controlled, as a function of speed, to reduce a risk of excessive steering actuator activity. In further embodiments, Tn may be set to exceed a majority of and/or all T values of a population of vehicles to be controlled, as a function of speed, and/or above 1 second to reduce a risk of excessive steering actuator activity and/or to reduce a need for a high clocking rate of controller 130 (e.g., above 100 Hz). In some embodiments, the population of vehicles to be controlled may correspond to a type of vehicle, such as a type of plane, automobile, or watercraft (e.g., sailboat, powerboat, ship, submarine, and/or other vessel capable of operating in or on water). In various embodiments, values of K and T for a population of vehicles may be determined and/or approximated through performance of real-time trials, control loop modeling (e.g., using one or more of the control loops described herein), and/or estimation.

Advantageously, the nominal vehicle predictor may be implemented as a transfer function acting on only one (e.g., steering rate) of the two state variables (e.g., heading and steering rate) of the control loop, which makes implementation easier due to, at least in part, a reduced need for computing resources. In various embodiments, controller 130 may be configured to store the nominal vehicle steering rate output of block 514 before proceeding to block 516.

In block 516, controller 130 receives a steering rate from plant 550 and a nominal vehicle steering rate from block 514 and combines them to produce a differential steering rate that is then provided to block 518. In some embodiments, the differential steering rate may represent a difference between the steering rate and the nominal vehicle steering rate. In various embodiments, plant 550 may be implemented as one or more of orientation sensor 140, gyroscope and/or accelerometer 142, speed sensor 144, GPS 146, steering sensor/actuator 150, propulsion system 170, and/or other modules 180. For example, controller 130 may be adapted to determine a measured steering rate from sensor signals received from one or more of sensors 140-146 and/or other modules 180.

In blocks 518 and 520, controller 130 receives a differential steering rate from block 516, applies a feedback gain (e.g., block 518) to the differential steering rate, and integrates (e.g., block 520) the amplified differential steering rate to produce a nominal vehicle feedback signal 521 that is then provided to blocks 512 and 522. In various embodiments, the gain applied by block 518 is a control loop parameter that may be modified by user input and/or adaptive training by control loop 500.

In additional embodiments, a sub-control loop including at least blocks 512, 514, 516, 518, and/or 520 may be iterated multiple times for each update of, for example, plant 550. In such embodiments, inputs of blocks 512 and/or 516 may be set to a prior-used value for a number of iterations of the sub-control loop. In some embodiments, such a sub-control loop (e.g., nominal vehicle feedback system 510, optionally including block 522) may be implemented as a device and/or instructions separate from a device and/or instructions implementing one or more of the remaining blocks of control loop 500, for example. For instance, block 504 and/or nominal vehicle feedback system 510 may be implemented as separate electronic devices.

In block 522, controller 130 filters a nominal vehicle feedback signal output by block 520 and provides a filtered nominal vehicle feedback signal to block 508a. In some embodiments, block 522 may be implemented as a low pass filter. In further embodiments, block 522 may be implemented with a selectable bandwidth that can be modified based on a user-selectable responsiveness setting. In other embodiments, the filter bandwidth is a control loop parameter that may be modified based on a received user input and/or adaptive training implemented with control loop 500. For example, the filter bandwidth may be modified based on a target acceptable output noise level in the feedback adjusted steering demand.

In additional embodiments, a sub-control loop including blocks 508a, 512, 514, 516, 518, 520, 522, and/or 532 and 534 may be iterated multiple times for each update of, for example, blocks 502 and/or 506. In such embodiments, an input of block 508a corresponding to an output of block 504 may be set to a prior-used value for a number of iterations of the sub-control loop. In some embodiments, such a sub-control loop may be implemented as a device and/or instructions separate from a device and/or instructions implementing one or more of the remaining blocks of control loop 500, for example. For instance, blocks 502 and/or 504 may be implemented as an electronic device separate from controller 130 in FIG. 1.

In one embodiment, nominal vehicle feedback system 510 may be implemented as an electronic device adapted to be installed on a vehicle with an existing directional control system including a proportional-derivative and/or proportional derivative controller module and one or more components similar to sensors 140-146, steering sensor/actuator 150, and/or other modules 180 of FIG. 1.

In embodiments where control loop 500 is implemented with a proportional-differential controller module and a nominal vehicle predictor (e.g., block 512), embodiments of control loop 500 may be implemented as a critically damped control loop with a higher bandwidth (e.g., responsiveness) than if the nominal vehicle predictor were acting alone to stabilize directional control of, for example, mobile structure 101. For example, a controller implementing control loop 500 may include a proportional-derivative controller allowing freedom to design a critically damped controller with higher bandwidth than if a nominal vehicle predictor were acting alone to stabilize yaw (e.g., in some embodiments, the nominal vehicle predictor feedback may pass through a filter with relatively low bandwidth because a high gain in the nominal vehicle predictor can introduce noise). Further examples are provided below in relation to FIG. 6.

In accordance with various embodiments of the present disclosure, various control loop parameters, user inputs, sensor signals, controller signals, and other data, parameters, and/or signals described in connection with control loop 500 may be stored at various points in the control loop, including within and/or during execution of any one of the blocks of a particular control loop.

Figure 6:
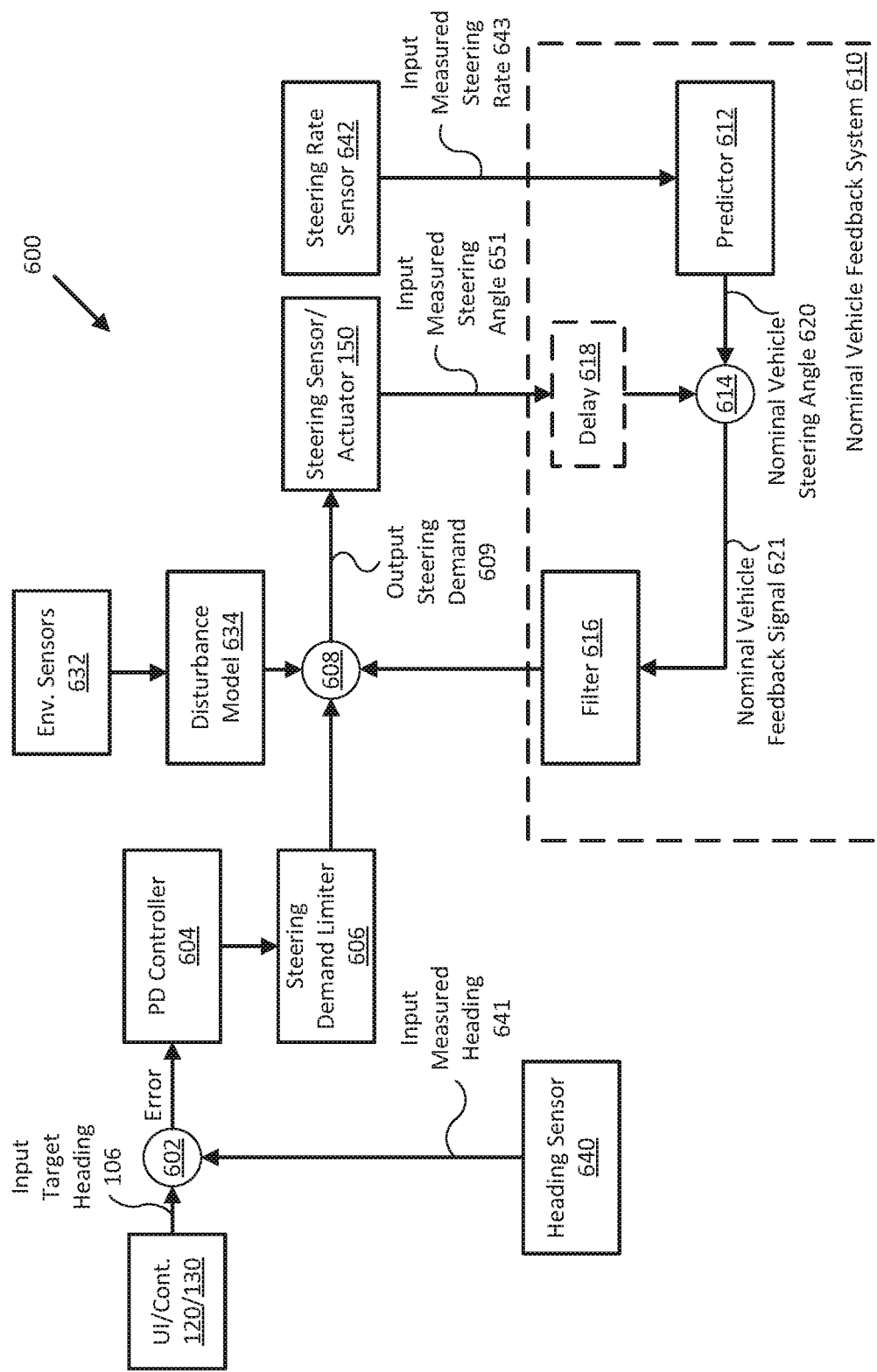
FIG. 6 illustrates a flow diagram of a control loop to provide proactive directional control in accordance with an embodiment of the disclosure.

FIG. 6 illustrates a flow diagram of a control loop to provide proactive directional control in accordance with an embodiment of the disclosure. In some embodiments, the operations of FIG. 3 may be performed by controller 130 processing and/or operating on signals received from one or more of sensors 140-146, steering sensor/actuator 150, propulsion system 170, user interface 120, and/or other modules 180. Each block may be implemented entirely as instructions executed by controller 130, for example, or may be implemented in a combination of executable instructions and hardware. It should be appreciated that any step, sub-step, sub-process, or block of control loop 600 may be performed in an order or arrangement different from the embodiment illustrated by FIG. 6. For example, although control loop 600 includes block 606, in other embodiments, block 606 may not be present. Outputs of various blocks in control loop 600 may be set as initial conditions prior to controller 130 executing block 602. Moreover, controller 130 may be configured to store the output of any block before proceeding to other blocks in control loop 600.

In various embodiments, control loop 600 may include various aspects of control loop 200 of FIG. 2, control loop 300 of FIG. 3, and/or filter 216 of FIG. 5. For example, as shown in FIG. 6, control loop 600 includes nominal vehicle feedback system 610 corresponding to aspects of control loop 200 and/or 300. Additionally, blocks and/or modules providing modeled data in control loops 200 and/or 300 may be absent in control loop 600 and replaced with one or more sensors providing measured data in place of the modeled data.

In block 602, controller 130 receives target heading 106 and a measured heading 641 from heading sensor 640 and combines them to produce an error output that is then provided to block 604. For example, controller 130 may be adapted to receive target heading 106 as user input from user interface/controller 120/130 and measured heading 641 as a sensor signal provided by, for example, orientation sensor 140. In other embodiments, heading sensor 640 may be implemented as one or more of sensors 140-146 and/or other modules 180. In some embodiments, the error output may represent a difference between target heading 106 and measured heading 641.

In block 604, controller 130 uses and/or executes, for example, a proportional-derivative controller module to receive the error output of block 602 and provide a steering demand to block 606. Various parameters of block 604 may be used to determine the steering demand output by block 604. In some embodiments, block 604 may be implemented as a proportional-derivative-integral controller with one or more of the corresponding gain terms (e.g., proportional, derivative, and/or integral) set to zero. In one embodiment, parameters of the proportional-derivative controller module may be managed to produce a critically damped response with a time constant of 6*Tn and with a damping ratio of 1.25, for example, to sufficiently tune the proportional-derivative controller module for relatively high mobile structure speeds.

In other embodiments, controller 130 may be configured to modify one or more of the parameters, gain terms, a deadband, and/or a limit on the output of the proportional-derivative or proportional-derivative-integral controller module based on a responsiveness setting received from user interface 120 (e.g., before, after, or at approximately the same time target heading 106 is received). For example, a responsiveness setting (e.g., Performance, Cruising, Economy) may allow a user to choose between a sharper response or reduced steering mechanism (e.g., rudder 152) activity, as described herein. In further embodiments, controller 130 may be configured to modify one or more of the gain terms and/or other parameters of block 604 based on adaptive training of control loop 600, as described herein.

In block 606, controller 130 uses and/or executes a steering demand limiter to receive the steering demand output of block 604 and provide a limited steering demand (e.g., a limited rudder demand) to block 608. In some embodiments, the steering demand limiter may be adapted to limit the steering demand to produce a steering actuator rate demand less than a steering actuator rate limit and/or a steering demand less than a steering actuator angle limit. For example, steering sensor/actuator 150 may be implemented to have a steering actuator rate limit "R". A steering actuator rate demand may be directly proportional to a steering demand multiplied by a proportional gain term "Kg" of block 604 and a steering rate gain term "K", as defined herein, for mobile structure 101. To ensure the steering actuator rate is less than the steering actuator rate limit "R", it is sufficient to limit the steering demand provided by block 604 according to the steering actuator rate limit equation:

$$\text{steering demand} < R/(K*Kg);$$

where K is the forward gain of the mobile structure, as defined herein, and Kg represents the degree of steering demand (e.g., rudder demand) for each degree of error (e.g., degree of heading error) output by block 602.

In some embodiments, Kg may be an overall gain provided by an embodiment of block 604 including a proportional-derivative controller or a proportional-derivative-integral controller. In further embodiments, where K for mobile structure 101 is unknown, K can be determined by an autolearn procedure in an initial directional control trial, for example, or may be brought to a nominal or target value through use of an adaptive algorithm utilizing an appropriate control loop including a nominal vehicle predictor, such as control loop 200 in FIG. 2. In still further embodiments, the steering actuator rate limit equation may be modified to replace "K" with a term including corrections for lag and other second order effects, as described herein.

In some embodiments, one or more of blocks 602, 604, 606, and/or 608, in combination with steering sensor actuator 650 and/or other elements of system 100 and/or control loop 600 may be implemented and/or operated to control steering sensor/actuator according to any one or combination of the systems and methods described in U.S. Provisional Patent Application No. 61/934,678 filed Jan. 31, 2014 and entitled "HYDRAULIC SLIP COMPENSATION SYSTEMS AND METHODS", which is hereby incorporated by reference in its entirety.

In block 608, controller 130 receives a limited steering demand from block 606, a filtered nominal vehicle feedback signal from block 616, and a steering angle disturbance estimate from block 634, and combines them to produce a disturbance adjusted steering demand 609 that is then provided (e.g., as a controller signal) to steering sensor/actuator 150. In some embodiments, disturbance adjusted steering demand 609 may represent a difference between the limited steering demand and the filtered nominal vehicle feedback signal and the steering angle disturbance estimate. In further embodiments, the filtered nominal vehicle feedback signal from block 616 may be an initial condition set for block 616. In still further embodiments, the filtered nominal vehicle feedback signal from block 616 may be determined by nominal vehicle feedback system 610 using measured inputs as shown.

In block 634, controller 130 receives one or more environmental sensor signals from block 632 and determines a steering angle disturbance estimate that is then provided to block 608. In some embodiments, the steering angle disturbance estimate may include one or more components, such as a rudder trim component configured to compensate for an orbital velocity of water near rudder 152, for example, or a weather helm component configured to compensate for a turning moment caused by roll of mobile structure 101 associated with wind blowing across mobile structure 101. In various embodiments, block 634 may be implemented as a feed forward disturbance model configured to determine the steering angle disturbance adjustment based, at least in part, one or more environmental conditions associated with mobile structure 101, such as wind blowing across a body of water, for example, or a wave pattern on a body of water.

In one embodiment, controller 130 may be configured to determine a wave height, length, period, and/or propagation direction for a wave pattern based, at least in part, on a series of pitch angles for mobile structure 101. Controller 130 may be configured to determine an orbital velocity associated with water at rudder 152 based, at least in part, on the wave characteristics, and to determine a corresponding rudder trim component of the steering angle disturbance adjustment. In some embodiments, controller 130 may be configured to determine the propagation direction for the wave pattern based, at least in part, on a series of roll angles of mobile structure 101 (e.g., provided by orientation sensor 140 and/or gyro/accelerometer 144). Controller 130 may derive a lateral speed from the propagation direction, for example, and include that in the rudder trim component. In other embodiments, controller 130 may be configured to steer mobile structure in the propagation direction for the wave pattern in order to steer down a wave.

In another embodiment, controller 130 may be configured to receive one or more wind speeds, wind directions, and/or a series of roll angles for mobile structure 101 corresponding to the wind speeds and/or wind directions, for example, and to determine at least one weather helm component of the steering angle disturbance adjustment based, at least in part, on the heading, and/or a mathematical relationship between the weather helm components and the wind speeds, wind directions, and/or series of roll angles. In some embodiments, the mathematical relationship may be provided by a user or a manufacturer. In other embodiments, controller 130 may be configured to determine and/or refine the mathematical relationship, particular to mobile structure 101, by storing the wind speeds, the wind directions, the series of roll angles, and/or the weather helm components and determining a statistical relationship (e.g., a histogram and/or other statistical relationship) between the stored weather helm components and the wind speeds, wind directions, and/or series of roll angles, to determine and/or refine the mathematical relationship.

In block 612, controller 130 uses and/or executes a nominal vehicle predictor to receive, process, and/or operate on a measured steering rate 643 (e.g., as a sensor signal) from steering rate sensor 642 and provide a nominal vehicle steering angle 620 to block 614. In various embodiments, steering rate sensor 642 may be implemented as one or more of orientation sensor 140, gyroscope and/or accelerometer 122, speed sensor 124, GPS 126, steering sensor/actuator 150, and/or other modules 180. For example, controller 130 may be adapted to determine a measured steering rate from sensor signals received from one or more of sensors 140-146, gyro/accelerometer 130, and/or other modules 180. In some embodiments, controller 130, heading sensor 640, steering rate sensor 642, and/or other elements of system 100 and/or control loop 600 may be implemented and/or operated to determine a measured steering rate according to any one or combination of the systems and methods described in U.S. Provisional Patent Application No. 61/942,517 filed Feb. 20, 2014 and entitled "ACCELERATION CORRECTED ATTITUDE ESTIMATION SYSTEMS AND METHODS", which is hereby incorporated by reference in its entirety.

In some embodiments, the nominal vehicle predictor may be implemented as a transfer function (e.g., in the S-plane) adapted to model dynamics of a nominal vehicle derived, at least in part, from a selection of mobile structures, as described herein. In one embodiment, the transfer function may be implemented in the form of a ratio of a nominal vehicle steering rate lag term "1+Tn*s" to a nominal vehicle steering rate gain term "Kn", which may be expanded to "Fn*s+Kn" as described similarly in connection with block 212 of FIG. 2. In another embodiment, the transfer function may be implemented in the form of a simplified ratio of a nominal vehicle steering rate lag term with zero lag (e.g., "1") to a nominal vehicle steering rate gain term "Kn", as described similarly in connection with block 312 of FIG. 3. In such embodiment, nominal vehicle feedback system 610 would typically compensate for steering rate lag through use of optional block 618. In various embodiments, nominal vehicle predictor 612 can be recognized as an inverse form of the transfer functions described with reference to block 228 of FIGS. 2 and 3.

Advantageously, the nominal vehicle predictor may be implemented as a transfer function acting on only one (e.g., steering rate) of the two state variables (e.g., heading and steering rate) of the control loop, which makes implementation easier due to, at least in part, a reduced need for computing resources.

In optional block 618, controller 130 receives a measured steering angle 651 (e.g., as a sensor signal) from steering sensor/actuator 150 and generates a delayed version of measured steering angle 651 to be provided to block 614. Measured steering angle 651 may be a steering angle (e.g., rudder angle) of mobile structure 101 sensed by steering sensor/actuator 150, for example, and may depend, at least in part, on steering demand 609 provided to steering sensor/actuator 150. For instance, in embodiments where steering sensor/actuator 150 can meet the requested steering demand 609 within an update time of at least a portion of control loop 600, steering angle 651 may substantially equal steering demand 609. In other embodiments, steering angle 651 may be proportional to steering demand 609, for example.

In some embodiments, optional block 618 may be implemented as a transfer function (e.g., in the S-plane) including a steering angle lag term "1+Dn*s" similar to that shown in FIG. 3. In other embodiments, block 618 may be implemented as a filter and/or other type of process to delay and/or simulate delay of measured steering angle 651 by a nominal vehicle steering rate lag and/or a modeled steering rate lag before providing a delayed steering angle to block 614 for combination with nominal vehicle steering angle 620 from block 612.

In block 614, controller 130 receives an actual or, optionally, a delayed/filtered measured steering angle 651 (e.g., as a sensor signal) from steering sensor/actuator 150 and nominal vehicle steering angle 620 from block 612 and combines them to produce a nominal vehicle feedback signal 621 that may then be provided to block 616. In some embodiments, nominal vehicle feedback signal 621 may represent a difference between measured steering angle 651 and nominal vehicle steering angle 620. In various embodiments, nominal vehicle feedback signal 621 may correspond to a disturbance experienced by mobile structure 101.

In block 616, controller 130 filters nominal vehicle feedback signal 621 output by block 614 and provides a filtered nominal vehicle feedback signal to block 608. In some embodiments, block 616 may be implemented as a low pass filter. In further embodiments, block 616 may be implemented with a selectable bandwidth that can be modified based on a user-selectable responsiveness setting. In other embodiments, the filter bandwidth is a control loop parameter that may be modified based on a received user input and/or adaptive training implemented with control loop 600. For example, the filter bandwidth may be modified based on a target acceptable output noise level in steering demand 609. In various embodiments, filter 616 may be implemented as a multi-band filter.

In additional embodiments, a sub-control loop including blocks 608, 612, 614, 616, and/or 618 may be iterated multiple times for each update of, for example, blocks 604 and/or 606. In such embodiments, an input of block 608 corresponding to an output of block 606 may be set to a prior-used value for a number of iterations of the sub-control loop. In some embodiments, such a sub-control loop may be implemented as a device and/or instructions separate from a device and/or instructions implementing one or more of the remaining blocks of control loop 600, for example. For instance, blocks 602 and/or 604 may be implemented as an electronic device separate from controller 130 in FIG. 1.

In one embodiment, nominal vehicle feedback system 610 may be implemented as an electronic device adapted to be installed on a mobile structures with an existing directional control system including a proportional-derivative and/or similar controller module and one or more components similar to sensors 140-146, steering sensor/actuator 150, and/or other modules 180 of FIG. 1.

Because control loop 600 includes a proportional-differential controller module (e.g., block 604) and a nominal vehicle predictor (e.g., block 612), embodiments of control loop 600 may be implemented as a critically damped control loop with a higher bandwidth (e.g., responsiveness) than if the nominal vehicle predictor were acting alone to stabilize directional control of, for example, mobile structure 101. Because control loop 600 also includes a steering demand limiter (e.g., block 606), embodiments of control loop 600 may be implemented to avoid non-linear control loop responses corresponding to steering demands producing a steering actuator rate demand exceeding a steering actuator rate limit and/or a steering demand exceeding a steering actuator angle limit.

In accordance with various embodiments of the present disclosure, various control loop parameters, user inputs, sensor signals, controller signals, and other data, parameters, and/or signals described in connection with system 100 and/or control loops 200, 300, 500, or 600 may be stored at various points in the control loops, including within and/or during execution of any one of the blocks of a particular control loop.

Embodiments of the present disclosure can thus provide reliable and accurate proactive directional control for mobile structures. Such embodiments may be used to assist in navigation of a mobile structure and/or in the operation of other systems, devices, and/or sensors coupled to or associated with the mobile structure. For example, embodiments of the present disclosure may be used to provide proactive directional control for actuators used to aim an actuated device (e.g., a visible and/or infrared spectrum camera, a spotlight, other directional illumination and/or sensor systems) according to a desired direction. In such embodiments, the steering angle corresponds to the aiming angle (e.g., roll, pitch, and/or yaw) for the actuated device and the steering rate corresponds to the rate of change in the orientation of the actuated device in the direction actuated by the steering angle.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals and generate one or more control signals to provide proactive directional control for a mobile structure comprising a rudder and disposed on a body of water, wherein the logic device is adapted to:
receive a steering demand for the mobile structure;
determine a steering angle disturbance adjustment based, at least in part, on one or more environmental conditions associated with the mobile structure, wherein the one or more environmental conditions comprise a wave pattern on the body of water;
determine a wave height, length, period, and/or the propagation direction for the wave pattern based, at least in part, on a series of pitch angles for the mobile structure;
determine an orbital velocity associated with water at the rudder based, at least in part, on the height, length, period, and/or propagation direction for the wave pattern;
determine a rudder trim component of the steering angle disturbance adjustment based, at least in part, on the orbital velocity;
determine a disturbance adjusted steering demand based, at least in part, on the steering angle disturbance adjustment comprising the rudder trim component and the steering demand; and
generate the one or more control signals to provide the proactive directional control for the mobile structure based, at least in part, on the disturbance adjusted steering demand.

2. The system of claim 1, wherein the logic device is adapted to:
determine a heading error comprising a difference between a heading of the mobile structure and a propagation direction for the wave pattern; and
set the disturbance adjusted steering demand to the heading error to steer the mobile structure in the propagation direction for the wave pattern.

3. The system of claim 1, wherein the logic device is adapted to:
determine the propagation direction for the wave pattern based, at least in part, on a series of roll angles of the mobile structure;
determine a lateral speed for the mobile structure based, at least in part, on the propagation direction for the wave pattern and/or the orbital velocity; and
determine the rudder trim component of the steering angle disturbance adjustment based, at least in part, on the lateral speed and the orbital velocity.

4. A system comprising:
a logic device configured to receive one or more sensor signals and generate one or more control signals to provide proactive directional control for a mobile structure disposed on a body of water, wherein the logic device is adapted to:
receive a steering demand for the mobile structure;
determine a steering angle disturbance adjustment based, at least in part, on one or more environmental conditions associated with the mobile structure, wherein the one or more environmental conditions comprise a wind blowing over the body of water;
receive one or more wind speeds, wind directions, and/or a series of roll angles for the mobile structure corresponding to the wind speeds and/or wind directions;
determine at least one weather helm component of the steering angle disturbance adjustment based, at least in part, on a mathematical relationship between the at least one weather helm component and the wind speeds, wind directions, and/or series of roll angles;
determine a disturbance adjusted steering demand based, at least in part, on the steering angle disturbance adjustment comprising the at least one weather helm component and the steering demand; and
generate the one or more control signals to provide the proactive directional control for the mobile structure based, at least in part, on the disturbance adjusted steering demand.

5. The system of claim 4, wherein the logic device is adapted to:
store the wind speeds, the wind directions, the series of roll angles, and/or the at least one weather helm component; and
determine a statistical relationship between the stored at least one weather helm component and the wind speeds, wind directions, and/or series of roll angles, to determine or refine the mathematical relationship.

6. The system of claim 4, wherein the logic device is adapted to:
receive a steering angle and a steering rate of the mobile structure;
determine a nominal vehicle steering angle based, at least in part, on the steering rate; and
determine a nominal vehicle feedback signal based, at least in part, on a combination of the steering angle and the nominal vehicle steering angle, wherein the nominal vehicle feedback signal is provided to adjust the steering demand.

7. The system of claim 6, wherein the logic device, for the determine the nominal vehicle steering angle, is adapted to:
process the steering rate with a nominal vehicle predictor; and
receive the nominal vehicle steering angle from the nominal vehicle predictor, wherein the nominal vehicle predictor comprises a transfer function configured to model dynamics of a nominal vehicle derived, at least in part, from a selection of mobile structures.

8. The system of claim 7, wherein:
the transfer function comprises a ratio of a nominal vehicle steering rate lag term to a nominal vehicle steering rate gain term; and
the logic device, for the determine the nominal vehicle feedback signal, is adapted to determine a difference between the nominal vehicle steering angle and the steering angle as the nominal vehicle feedback signal.

9. The system of claim 7, wherein:
the transfer function comprises a ratio of a nominal vehicle steering rate lag term to a nominal vehicle steering rate gain term;
the nominal vehicle steering rate lag is set to zero within the nominal vehicle predictor; and the logic device, for the determine the nominal vehicle feedback signal, is adapted to determine a delayed steering angle based, at least in part, on the steering angle, and to determine a difference between the nominal vehicle steering angle and the delayed steering angle as the nominal vehicle feedback signal.

10. The system of claim 1, wherein:
the logic device is adapted to provide the disturbance adjusted steering demand to a steering actuator for the mobile structure; and
the steering demand is adjusted by a nominal vehicle feedback signal prior to being used to determine the steering angle disturbance adjustment.

11. The system of claim 1, further comprising:
a steering actuator configured to receive the disturbance adjusted steering demand provided as one of the control signals, wherein the mobile structure comprises a watercraft and the steering actuator is configured to control a rudder of the watercraft.

12. A method comprising:
receiving a steering demand for a mobile structure comprising a rudder and disposed on a body of water;
determining a steering angle disturbance adjustment based, at least in part, on one or more environmental conditions associated with the mobile structure, wherein the one or more environmental conditions comprise a wave pattern on the body of water;
determining a wave height, length, period, and/or the propagation direction for the wave pattern based, at least in part, on a series of pitch angles for the mobile structure;
determining an orbital velocity associated with water at the rudder based, at least in part, on the height, length, period, and/or propagation direction for the wave pattern;
determining a rudder trim component of the steering angle disturbance adjustment based, at least in part, on the orbital velocity;
determining a disturbance adjusted steering demand based, at least in part, on the steering angle disturbance adjustment comprising the rudder trim component and the steering demand; and
generating one or more control signals to provide directional control for the mobile structure based, at least in part, on the disturbance adjusted steering demand.

13. The method of claim 12, further comprising:
determining a heading error comprising a difference between a heading of the mobile structure and the propagation direction for the wave pattern; and
setting the disturbance adjusted steering demand to the heading error to steer the mobile structure in the propagation direction for the wave pattern.

14. The method of claim 12, further comprising:
determining the propagation direction for the wave pattern based, at least in part, on a series of roll angles of the mobile structure;
determining a lateral speed for the mobile structure based, at least in part, on the propagation direction for the wave pattern and/or the orbital velocity; and
determining the rudder trim component of the steering angle disturbance adjustment based, at least in part, on the lateral speed and the orbital velocity.

15. A method comprising:
receiving a steering demand for a mobile structure disposed on a body of water;
determining a steering angle disturbance adjustment based, at least in part, on one or more environmental conditions associated with the mobile structure, wherein the one or more environmental conditions comprise a wind blowing over the body of water;
receiving one or more wind speeds, wind directions, and/or a series of roll angles for the mobile structure corresponding to the wind speeds and/or wind directions;
determining at least one weather helm component of the steering angle disturbance adjustment based, at least in part, on a mathematical relationship between the at least one weather helm component and the wind speeds, wind directions, and/or series of roll angles;
determining a disturbance adjusted steering demand based, at least in part, on the steering angle disturbance adjustment comprising the at least one weather helm component and the steering demand; and
generating one or more control signals to provide directional control for the mobile structure based, at least in part, on the disturbance adjusted steering demand.

16. The method of claim 15, further comprising:
storing the wind speeds, the wind directions, the series of roll angles, and/or the at least one weather helm component; and
determining a statistical relationship between the stored at least one weather helm component and the wind speeds, wind directions, and/or series of roll angles, to refine the mathematical relationship.

17. The method of claim 15, further comprising:
receiving a steering angle and a steering rate of the mobile structure;
determining a nominal vehicle steering angle based, at least in part, on the steering rate; and
determining a nominal vehicle feedback signal based, at least in part, on a combination of the steering angle and the nominal vehicle steering angle, wherein the nominal vehicle feedback signal is provided to adjust the steering demand.

18. The method of claim 17, wherein the determining the nominal vehicle steering angle comprises:
processing the steering rate with a nominal vehicle predictor; and
receiving the nominal vehicle steering angle from the nominal vehicle predictor, wherein the nominal vehicle predictor comprises a transfer function configured to model dynamics of a nominal vehicle derived, at least in part, from a selection of mobile structures.

19. The method of claim 18, wherein:
the transfer function comprises a ratio of a nominal vehicle steering rate lag term to a nominal vehicle steering rate gain term; and
the determining the nominal vehicle feedback signal comprises determining a difference between the nominal vehicle steering angle and the steering angle as the nominal vehicle feedback signal.

20. The method of claim 18, wherein:
the transfer function comprises a ratio of a nominal vehicle steering rate lag term to a nominal vehicle steering rate gain term;
the nominal vehicle steering rate lag is set to zero within the nominal vehicle predictor; and
the method comprises determining a delayed steering angle based, at least in part, on the steering angle, and determining a difference between the nominal vehicle steering angle and the delayed steering angle as the nominal vehicle feedback signal.

21. The method of claim 12, wherein:
the method comprises providing the disturbance adjusted steering demand to a steering actuator for the mobile structure; and
the steering demand is adjusted by a nominal vehicle feedback signal prior to being used to determine the steering angle disturbance adjustment.

* * * * *

UNITED STATES PATENT AND TRADEMARK OFFICE
CERTIFICATE OF CORRECTION

PATENT NO. : 10,996,676 B2  
APPLICATION NO. : 15/640186  
DATED : May 4, 2021  
INVENTOR(S) : Mark Johnson, Ian Matt and Christopher Yeomans Page 1 of 1

It is certified that error appears in the above-identified patent and that said Letters Patent is hereby corrected as shown below:

In the Specification

In the Cross-Reference to Related Applications:

Column 1, Lines 50-51 change "patent application Ser. No." to --Patent Application No.--.

Column 2, Line 5 change "patent application Ser. No." to --Patent Application No.--.

Column 2, Line 36 change "patent application Ser. No." to --Patent Application No.--.

Column 2, Line 49 change "patent application Ser. No." to --Patent Application No.--.

Column 2, Line 61 change "patent application Ser. No." to --Patent Application No.--.

Column 2, Line 64 change "patent application Ser. No." to --Patent Application No.--.

Column 21, Line 12 change "patent application Ser. No." to --Patent Application No.--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*